(12) United States Patent
Maher et al.

(10) Patent No.: US 7,232,074 B2
(45) Date of Patent: Jun. 19, 2007

(54) CRUZCARD

(76) Inventors: Morgan Maher, 3531 Thomas Rd., Santa Cruz, CA (US) 95054; Charlie Centofante, 184 Hagemann Ave., Santa Clara, CA (US) 95062; Thomas Maher, 2071 Calie Ricardo, Pleasanton, CA (US) 94566; Larry Maher, 3858 Madison Common, Fremont, CA (US) 95062; Jim Jacques, 111 Brock Tree Barch Rd., Aptos, CA (US) 95003

( * ) Notice: Subject to any disclaimer, the term of this patent is extended or adjusted under 35 U.S.C. 154(b) by 138 days.

(21) Appl. No.: 10/954,392

(22) Filed: Sep. 30, 2004

(65) Prior Publication Data

US 2006/0065742 A1    Mar. 30, 2006

(51) Int. Cl.
*G06K 19/06* (2006.01)

(52) U.S. Cl. .................. 235/492; 235/382; 235/441; 235/487

(58) Field of Classification Search ............. 235/492, 235/382

See application file for complete search history.

(56) References Cited

U.S. PATENT DOCUMENTS 6,332,578 B1 * 12/2001 Niwata et al. ............ 235/486
6,832,730 B2 * 12/2004 Conner et al. ............ 235/487
2003/0155425 A1 * 8/2003 Lynch .................. 235/492

FOREIGN PATENT DOCUMENTS

WO    WO 99/12159    * 3/1999

* cited by examiner

*Primary Examiner*—Seung Ho Lee

(57) ABSTRACT

A memory chip and embedded microprocessor ('smart memory card') with a sputtered memory ring for additional memory capacity. The card configuration allows use with ISO 7816 compliant readers. The smart memory card has a spring bolt-hole which allows use of the smart memory card on an adaptor with compact disc and digital video disc drives. The memory chip and sputtered memory ring have sufficient capacity for high-density memory applications such as high-level encrypted security systems, biometric identification systems, and combination access systems. The processor configuration may include a wireless transceiver for 802.11 series, Bluetooth™ and other wireless systems.

1 Claim, 5 Drawing Sheets

CRUZCARD

The subject of this invention is the working of a smart chip mounted on a plastic card, which is the size of a charge card with a large memory. This present invention has a sputtered memory ring on the card that offers additional memory capacity. This invention provides a means for electrically connecting the smart chip mounted on the smart card on the standard compact disc (DVD) drive. This electrical connection is obtained by inserting the memory card into an adaptor that contains a smart chip probe that is electrically connected to the (DVD) drive. This electrical connection provides a method of addressing the identification security that is programmed on the smart chip, while the card is spinning, to regulate and control who is trying to read the memory on the card. If the identification of the user is not confirmed, the standard compact disc (DVD) drive will not be allowed to read or wrote data from the memory on the card. This is a way of securing and protecting the data that is written on the card. Since the memory card has to be inserted into an adapter card for use, the title of the invention is called "Smart Memory Card and Adaptor for DVD Player".

CROSS REFERENCE TO RELATED APPLICATIONS

The present invention is basically a memory card just like most credit cards except it has about 10 to 30 times more memory. The memory system on the present invention is sputtered symmetrically around the hole in the card. The present invention can be used to write things into the sputtered memory ring, change things that are written or it can be used to read the items that are written on the memory ring. The whole memory is exactly like a compact music disc that plays when its inserted into a standard compact disc (DVD) drive except that the user can reads, writes or change what is written. This present invention is held in place and spun like a music disc with a digital head that senses and reads and writes the data on the memory ring. Besides the larger memory size this invention has the capability to store information that is written into the memory by a standard compact disc (DVD) drive.

A lot of credit cards or identification cards have a smart chip used for security and identification of the user. That is the same reason that this card has a smart chip also. The times and it can be read if its spinning or not spinning. So if this card is removed from the standard compact disc (DVD) drive, the security identification is rejected. This arrangement gives the card a identification and then accesses the data without change and insertiing into another reader. Also the identification can be a picture, a thumb or finger print, eye retina comparison or even voice and speech identification.

Because of the larger memory and a much better identification security system, this present invention can be used for many more applications. The present invention can be used for a Visa Card, Bank Card, Health Card, Prescription Card, Security Card and a lot of other uses that require a larger memory and good security.

BACKGROUND OF THE INVENTION

Portable memory systems currently include high priced magnetic discs, flash memory cards, magnetic strip cards, digital discs and to a degree, magnetic drives, and cards combining flash memory and microprocessors.

The former group of memory cards suffers from limitations in memory density. Each style requires a specifically configured reader that lacks the user into a proprietary system. Magnetic drives have achieved portability, but are still subject to handling damage, and require a computer system to access the information stored on the drive. Furthermore, each system lacks sophisticated security without a secondary security access system.

Flash memory and micro processor combination are referred to smart memory cards. These cards are available in a limited variety of configurations requiring configuration specific readers. The current state of the art suffers from the limitation of low memory density to hold down the cost, or exorbitant cost to achieve higher density memory. The current state of the art also suffers from a lack of embedded security secondary security system.

There is a need for a portable high-density memory system with high security at a consumer-oriented price. Furthermore, with the proliferation of competing memory and security access systems, there is a need for an adaptive memory system that can be used across several popularly available memory and security access systems.

BRIEF SUMMARY OF THE INVENTION

The present invention is a high capacity smart card with a smart card processor chip mounted on the card surface for encrypted security. Mounted on the back side of the card surface is a sputtered memory ring that contains additional memory capacity all in the size of a credit card. The smart card chip that is mounted on the face of the card must meet standard ISO 7816 specifications in terms of contact pad locations and dimensions. The additional memory is read by a conventional compact disc (DVD) drive. This present invention is the size of a business card, which is 85.5 mm×54.0 mm×0.076 mm thick. This present invention will also work in future commercial optical storage drives and technologies such as Blue Laser and Mr. Rainier which will increase the memory capacity many times. This adaptive smart memory card can be manufactured by stamping, molded, or machined using a basic thermoplastic material such as polycarbonate and then covered with a hard coat carbonate for scratch protection.

This invention provides a means for electrical connecting the smart chip that is mounted on the card to the circuit inside the compact disc (DVD) drive. This electrical connection provides a method of addressing the identification security that is programmed on the smart card chip to regulate or control the using of the compact disc (DVD) player. If the identification of the user is not confirmed, the compact disc (DVD) player will not be allowed to read or write data to the recording memory.

This invention will not change the card shown on FIG. 1*a* and FIG. 1*b*. The invention will use an adapter (FIG. 2) by installing a smart chip probe in the adapter disc recession to allow a continues probing connection at all times when the card is place in position.

Also a minor permanent electronic wiring will be required to connect the smart chip probe to the optical circuits and the bus rings on the adapter connection as shown in FIG. 2.

Also the compact disc (DVD) player tray in the standard compact disc (DVD) drive must be modified as shown in FIG. 3. The compact disc (DVD) player tray will have an opening in the center so the adapter with the card FIG. 2 will be centered by the four retainer tabs so the adapter can be latched to the spindle motor and allowed to spin without rubbing on the compact disc (DVD) player tray. The compact disc (DVD) player tray must be wired with contact pins for contacting the bus rings, which is also connected to the optical circuit in the standard compact disc (DVD) drive.

The present invention called "Smart Memory Card and Adaptor for DVD Player" brings a much larger memory to a memory card with increased security that is present while the card is spinning in the standard compact disc (DVD) drive. These improvements will be available in a memory card for a total cost of approximately $10.00 dollars per card.

DETAILED DESCRIPTION

Figure 1A:
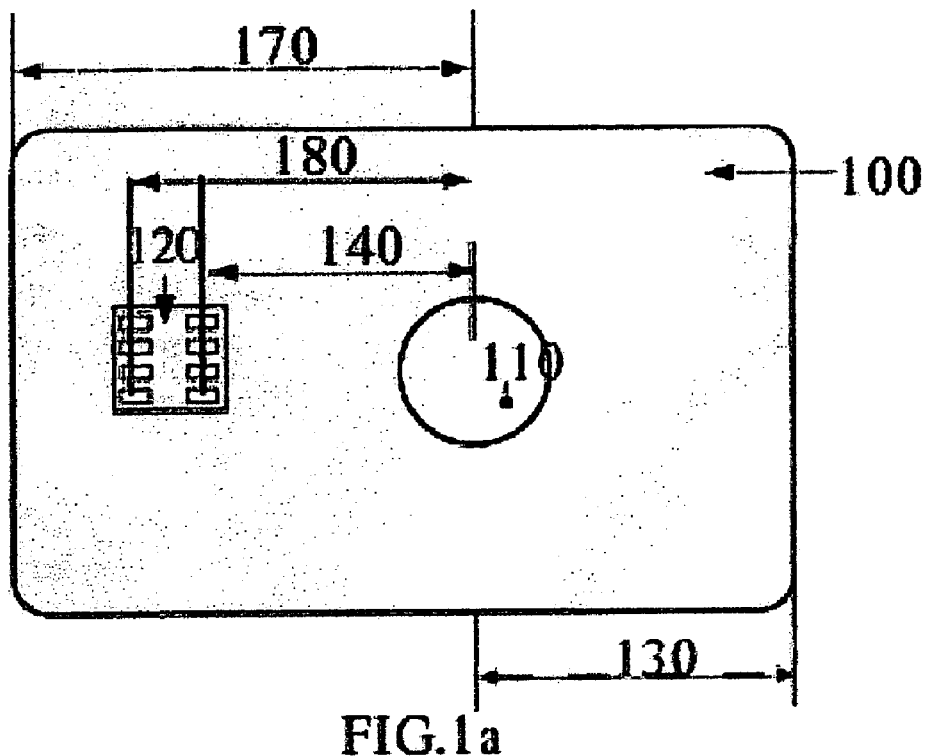
FIG. 1a shows a top view of the smart memory card showing the position of the smart chip according to ISO 7816 with the smart chip pads, and the off-center hole in the card.

FIG. 1 shows the first planar surface of the smart memory card (100). The card may be made from a standard 120-mm diameter polycarbonate compact disc with a thickness of 0.60-mm. The disc is then cut to the size of a standard credit size so that the center of the 15-mm spring bolt-hole (110) is located 37.75-mm (130) from one length-wise edge and is 47.75-mm (170) from the opposite length-wise edge. The spring bolt-hole (110) is then 10-mm off-center length-wise.

A smart memory chip (120) is placed on the first planar surface of the smart memory card (100) so that the nearer adjacent probes of the smart memory chip (120) are located a distance (140) according to ISO 7816. The far adjacent probes are then located a distance (180) also according to ISO 7816.

This memory chip (120) configuration allows the smart memory card (100) to be inserted into a standard ISO 7816 smart memory card reader and still allow ample space for a sputtered memory ring on the opposing side.

Figure 1B:
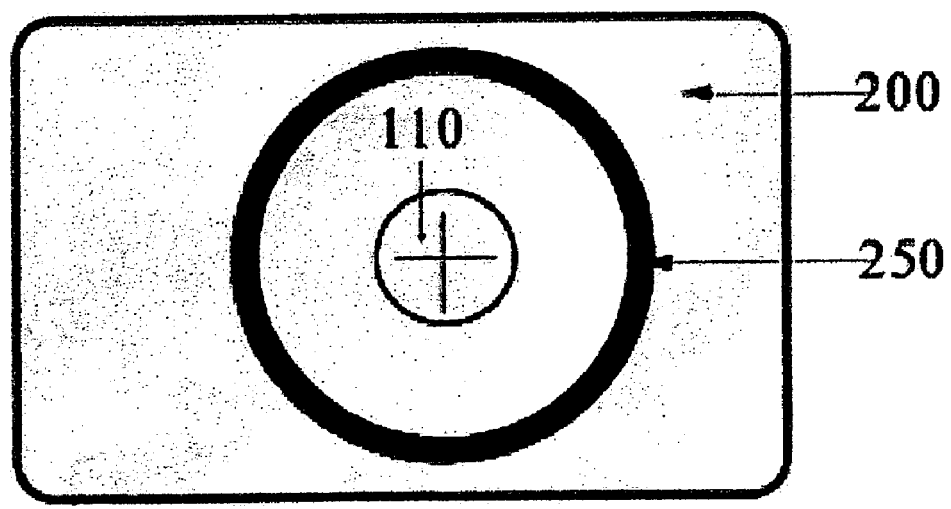
FIG. 1b is a bottom view of the smart memory card showing the sputtered memory ring.

FIG. 1b shows the second planar surface (200) of the smart memory card (100). A sputtered ring (250) of optical read and write recording material is laid on this second planar surface (200) around the spring bolt-hole (110). Those skilled in the art will appreciate that the sputter ring is made using standard DVD technology. This sputtering is performed with standard sputtering equipment and then covered with a hard thermoplastic or thermo set material in order to protect against surface scratching. Additional thickness may then be added with hard coat, bringing the overall thickness of the smart memory card (100) to approximately 0.760-mm thick.

FIG. 2 shows the disc adaptor (300) in detail for communicative coupling of the smart memory card (100) to a compact disk or digital video disc (DVD) drive. The adaptor disc (300) is cut to size from a blank CD disc.

Figure 2A:
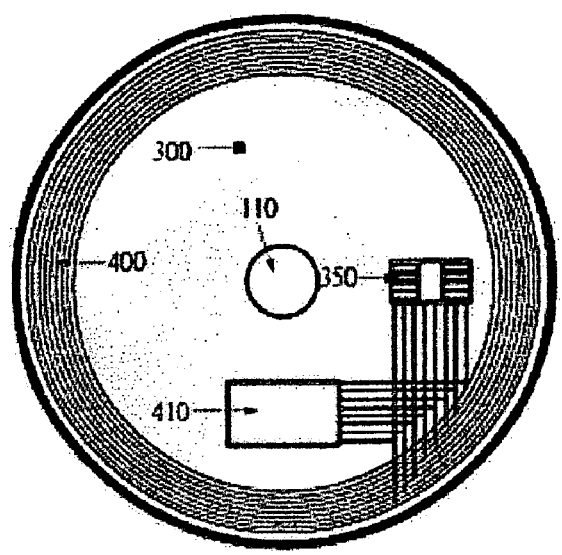
FIG. 2a is the top view of the adaptor card showing the memory chip probe which is electrically connected to the adaptor bus rings and also the optical circuit.
Figure 2B:
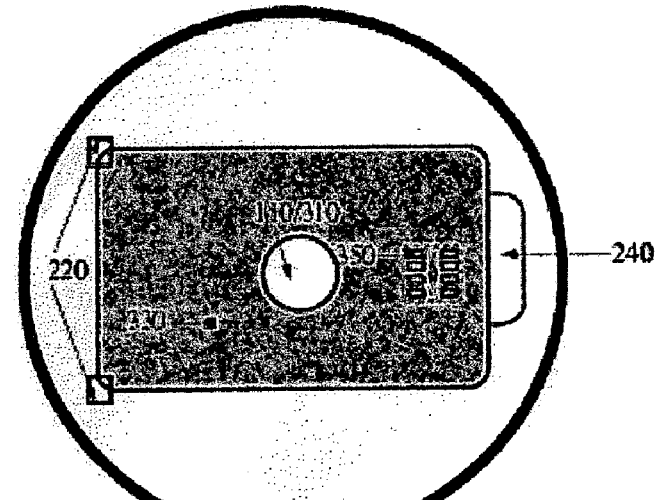
FIG. 2b is the bottom view of the digital video disc adaptor, showing the adaptor cavity for holding the smart memory card with the coupling chip probes piercing throw the top of the cavity that connect the smart memory card to the compact disc and digital video disc drive.

The smart memory card (100) rests in an adaptor cavity (330) of the adapter (300) as shown in FIG. 2b. Tabs (220) on the outer edge hold the smart memory card (100) on one side. The off-center spring bolt-hole (110) of the smart memory card (100) lines up with adaptor disc hole (310) to complete an aligned secure hold of the smart memory card (100) in the adaptor (300). The smart memory card (100) is also locked in the cavity (330) with the spring lock (240).

Probe pins (350) align with, and communicatively connect the smart memory chip (120) to the bottom side of the adaptor (300).

FIG. 2a shows the top side of the compact disc and digital video disc adaptor (300) for the smart memory card (100). The probe pins (350) communicatively couple the smart memory chip to the adaptor optical circuitry (410). The adaptor bus memory ring circuitry (400) communicatively couples the probe pins (350) to the adaptor bus memory rings (400).

Figure 2C:
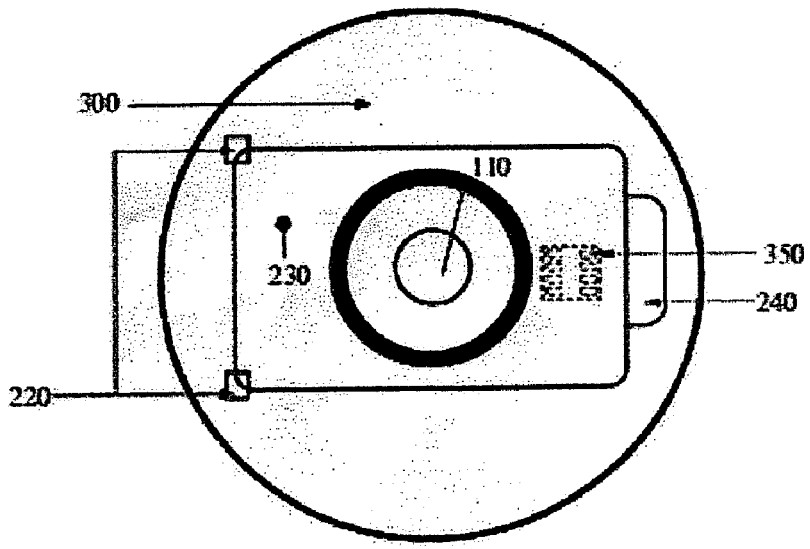
FIG. 2c is the bottom view of the digital video disc adaptor with the memory card latched in position connecting the memory chip probing on the top side of the memory card to the compact disc and digital video disc drive.

FIG. 2c shows the smart memory card (100) placed into the adapter cavity (330) on the adapter disc (300). The smart memory chip (120) side is face up. In this profile they appear as a single disc, so the card and adaptor may be inserted into a standard compact disc or digital video disc (DVD) drive.

Figure 3:
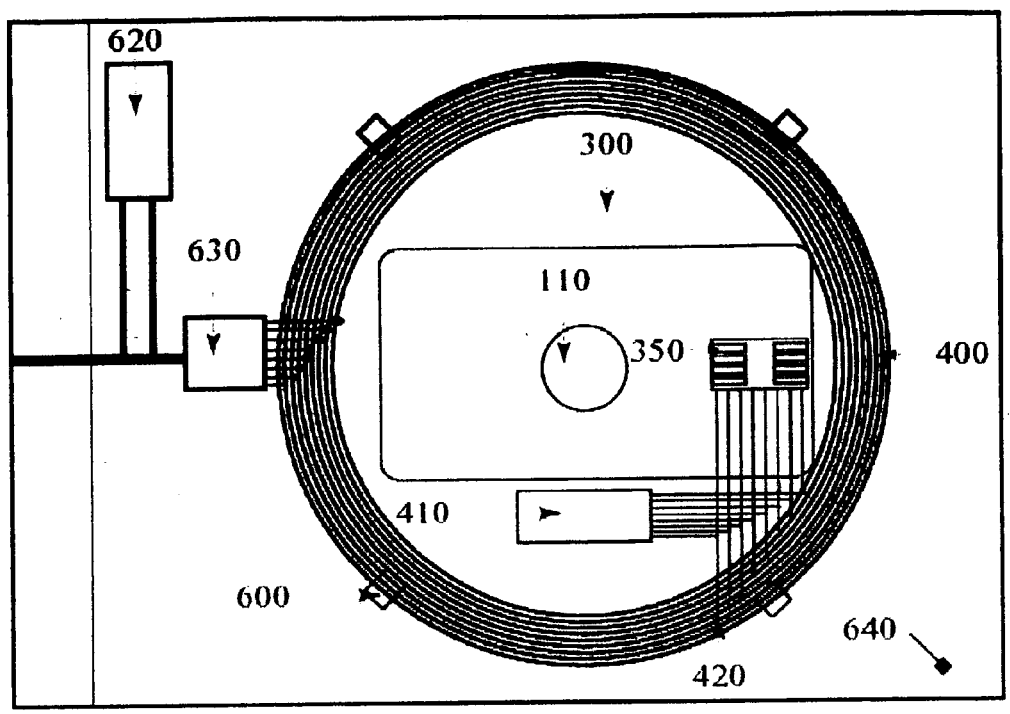
FIG. 3 is the adapter disc placed into a compact disc or digital video disc reader tray.

FIG. 3 shows the adapter disc (300) placed into a compact disc or digital video disc (DVD) reader tray (640). The side holding the smart memory card (100) is placed face down. Tray guides (600) may be used to hold the adapter disc (300).

The adaptor optical circuitry (410) communicatively couples the smart memory card (100) to the disc drive, while the adaptor bus memory rings (400) communicatively couples with the disc drive optical circuitry (420, 630 and 620).

These connections address the identification security programmed on the smart memory chip (120) to control use of the compact disk or digital video disk (DVD) drive with the smart memory card (100). If the identification of the user is not confirmed, the disc drive will not be allowed to read or write the data from the sputtered memory ring (250) of the smart memory card (100).

This probed connection is similar to the ISO 7816 smart card reader. The advantage of the smart memory card is that it requires only one insertion for reading the smart memory chip (120) and also accessing the data on the sputtered memory ring (250).

Figure 4:
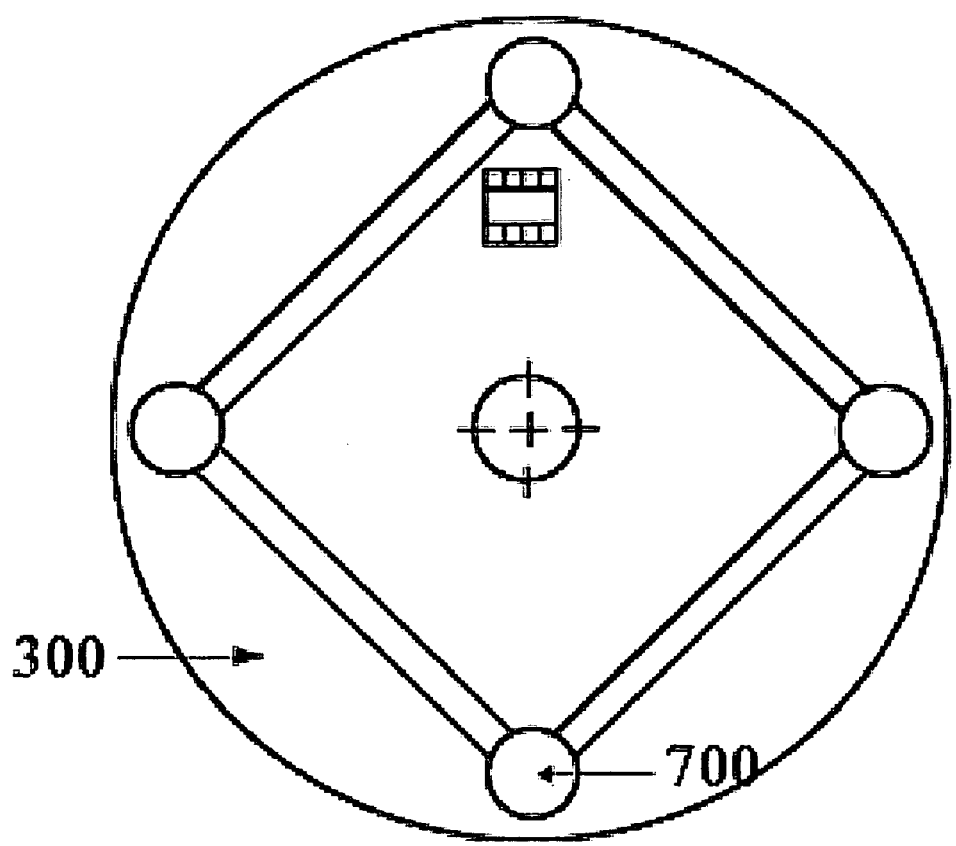
FIG. 4 is the top view of the adaptor with a wireless connection and antenna.

FIG. 4 shows the disc adapter (300) fitted with an adaptor wireless booster (700) for use of the smart memory card (100) incorporating a wireless communicative system. Such a wireless communicative system could be a PHILIPS MIFARE PROX interface, which is ISO 14443A compliant. Alternative embodiments of the wireless communicative system include the 802.11 series, Blue Tooth™, and R-F short-range systems.

This contact-less smart memory card reader works by placing the smart memory card in proximately to the adaptor wireless booster (700) on the disc adapter (300) in the compact disc or digital video disc (DVD) drive. The wireless communication system transceiver is then placed in proximately to the compact disc or digital video disc (DVD) drive. This wireless communication system eliminates the need of a probe to connect to the smart card chip.

Figure 5:
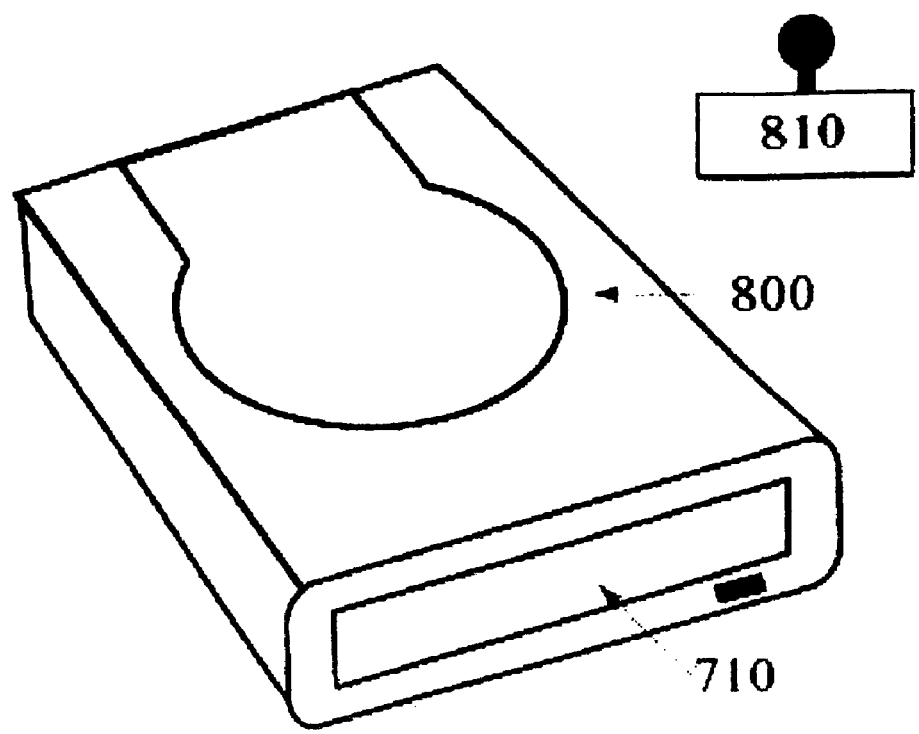
FIG. 5 is the top or normal view of a compact disc (DVD) drive used to spin up the adaptor holding the memory card while probing the memory chip on the memory card surface.

FIG. 5 shows a compact disc or digital video disc (DVD) drive (800) with a wireless receiving antenna (810) located separate from the drive. The drive loading door is (710).

What is claimed is:

1. A system comprising;
   a standard size memory card comprising an off center hole in the card and a memory ring located around the center hole in addition to a attached memory chip mounted to the face of the card;
   an adapter disc which is designed to hole the off center memory card so the memory chip can be probed and the memory ring can be connected to the adapter bus memory ring;
   the video disc drive (DVD) connecting the adapter disc bus memory ring with the memory card to the video disc drive (DVD) and verifies the security of the user with information stored in the memory chip then connect the user to the memory on the memory ring to the video disc drive (DVD);
   wherein information stored on the memory card can be accessed in response to successful verification thereafter.

* * * * *